United States Patent
Madasu et al.

(10) Patent No.: US 10,762,254 B2
(45) Date of Patent: Sep. 1, 2020

(54) SIMULATING MULTI-DIMENSIONAL FLOW WITH COUPLED ONE-DIMENSIONAL FLOW PATHS

(71) Applicant: Halliburton Energy Services, Inc., Houston, TX (US)

(72) Inventors: Srinath Madasu, Houston, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 136 days.

(21) Appl. No.: 15/757,683

(22) PCT Filed: Nov. 4, 2015

(86) PCT No.: PCT/US2015/059034
§ 371 (c)(1),
(2) Date: Mar. 6, 2018

(87) PCT Pub. No.: WO2017/078700
PCT Pub. Date: May 11, 2017

(65) Prior Publication Data
US 2019/0042676 A1 Feb. 7, 2019

(51) Int. Cl.
*G06F 30/20* (2020.01)
*E21B 43/25* (2006.01)
(Continued)

(52) U.S. Cl.
CPC .......... *G06F 30/20* (2020.01); *E21B 41/0092* (2013.01); *E21B 43/25* (2013.01);
(Continued)

(58) Field of Classification Search
CPC .. G06F 17/5009; G06F 2217/16; E21B 43/25; E21B 49/00; E21B 41/0092; E21B 43/26
See application file for complete search history.

(56) References Cited

U.S. PATENT DOCUMENTS

| 4,803,873 A | 2/1989 | Ehlig-Economides |
| 2002/0016702 A1 | 2/2002 | Manceau et al. |

(Continued)

FOREIGN PATENT DOCUMENTS

WO 2017078700 A1 5/2017

*Primary Examiner* — Wei Wang
(74) *Attorney, Agent, or Firm* — John Wustenberg; Parker Justiss, P.C.

(57) ABSTRACT

An illustrative formation flow simulation method includes: measuring horizontal and vertical permeability of at least one bed in a formation penetrated by a vertical borehole; representing the borehole as a linear, discretized borehole flow path; representing the formation as a plurality of horizontal layers, each layer of the plurality of horizontal layers being represented as a linear, discretized layer flow path; constructing a current state vector having values of flow parameters for the discretized borehole flow path and each of the discretized layer flow paths; constructing a solution matrix embodying a set of flow equations that relate the current state vector to a subsequent state vector, the flow equations employing the measured horizontal permeability for flow along the discretized layer flow path for each layer and employing the measured vertical permeability for cross-flow to or from each layer, wherein the solution matrix, current state vector, and subsequent state vector form a linear system of equations; solving the linear system of equations to derive the subsequent state vector from the current state vector; and storing the subsequent state vector on a non-transitory information storage medium.

18 Claims, 2 Drawing Sheets

(51) Int. Cl.
*E21B 41/00* (2006.01)
*E21B 49/00* (2006.01)
*E21B 43/26* (2006.01)
*G06F 111/10* (2020.01)

(52) U.S. Cl.
CPC .............. *E21B 49/00* (2013.01); *E21B 43/26* (2013.01); *G06F 2111/10* (2020.01)

(56) References Cited

U.S. PATENT DOCUMENTS

2014/0025360 A1 1/2014 Alshawaf et al.
2014/0039853 A1 2/2014 Fung
2014/0129199 A1 5/2014 H.
2017/0316130 A1* 11/2017 Shetty .................. E21B 43/267

* cited by examiner

SIMULATING MULTI-DIMENSIONAL FLOW WITH COUPLED ONE-DIMENSIONAL FLOW PATHS

CROSS-REFERENCE TO RELATED APPLICATION

This application is the National Stage of, and therefore claims the benefit of, International Application No. PCT/US 2015/059034 filed on Nov. 4, 2015, entitled "SIMULATING MULTI-DIMENSIONAL FLOW WITH COUPLED ONE-DIMENSIONAL FLOW PATHS," which was published in English under International Publication Number WO 2017/078700 on May 11, 2017. The above application is commonly assigned with this National Stage application and is incorporated herein by reference in its entirety.

BACKGROUND

Unconventional reservoirs often have a low-permeability rock matrix that impedes fluid flow, making it difficult to extract hydrocarbons (or other fluids of interest) at commercially-feasible rates and volumes. Fortunately, various treatments can be used to increase the effective permeability of the formation. For example, when a proper acidic solution is injected into the formation, it dissolves regions of the matrix around the pores to create "wormholes" through which fluids can more easily flow.

To determine the desirability of an acidizing treatment, reservoir engineers may employ formation models with three spatial dimensions for simulating this unsteady process, numerically solving the fluid flow governing equations to determine the transient formation fluids' transient behavior before the treatment, as well as to determine the flow of injected treatment fluids for estimating changes to effective permeability in all directions, and to simulate the flow of formation fluids after the treatment while accounting for anisotropic permeability. See, e.g., Bagheri, M. and Settari, A., "Methods of Modelling full Tensor Permeability in Reservoir Simulators", PETSOC-07-03-02, 2007; and Yetkin C., Ramiraz B., Al-Kobaisi, M., Ozkan, E., "A Simple Method to Account for Permeability Anisotropy in Reservoir Models and Multi-Well Pressure Interference Tests", SPE 122972, 2009. Using such simulators, the treatment design engineers can then compare fluid flows "before" and "after" the treatment operation to evaluate and optimize the effectiveness of the treatment.

Unfortunately, such three spatial dimensional modeling often imposes computational resource requirements that are prohibitive and typically not justified in view of the limited amount of information regarding downhole reservoir conditions. Accordingly, various alternative approaches have been sought to significantly reduce the computational resource requirements while still providing sufficiently accurate results that account for, among other things, the effects of anisotropic permeability. See, e.g., Cline, S. B. and Tiab, D., "Studies in Vertical and Horizontal Well-Flow Behavior in cases of Permeability Anisotropy", SPE 71085, 2001; and Azom, P. N., Srinivasan, S., "Modeling the Effect of Permeability Anisotropy on the Steam-Assisted Gravity Drainage (SAGD) Process", SPE 149274, 2011. The accuracy of these alternative approaches remains insufficient for many applications.

BRIEF DESCRIPTION OF THE DRAWINGS

Accordingly, the drawings and the following description disclose simulation systems and methods that simulate multi-dimensional flow using coupled one-dimensional flow paths. In the drawings.

Figure 1A:
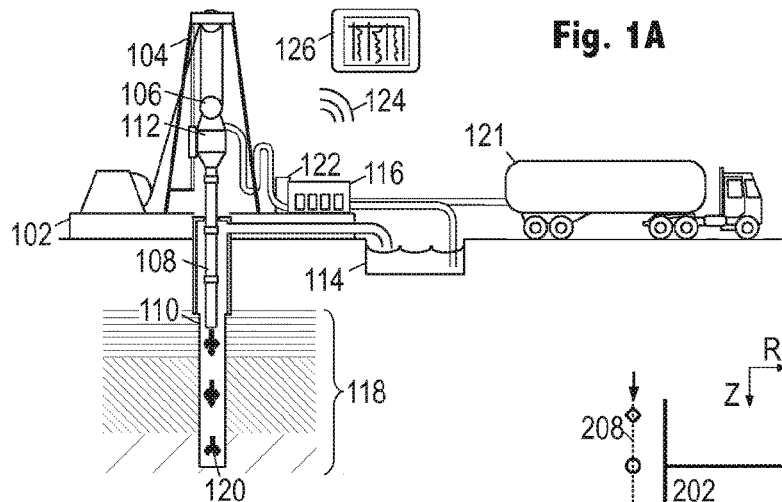
FIG. 1A is an environmental view of an illustrative acidizing operation.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

FIG. 1A shows an illustrative acidizing operation to serve as context for describing the disclosed systems and methods, though it will become clear that they are applicable to a wide range of situations where it would be desirable to determine formation fluid flow distributions. A drilling platform 102 supports a derrick 104 having a traveling block 106 for raising and lowering a drill string or other tubing string 108 into a partially cased borehole 110. As the tubular string 108 is lowered into the borehole 110, a top drive 112 supports and rotates the tubular string while supplying a flow of fluid through the interior. At least some of the fluid flow returns along the annulus around the tubing string 108, providing lubrication and sweeping debris upward into a retention pit 114 on the surface. Cleaning equipment removes cuttings and other debris from the fluid, enabling it to be recycled. A pump 116 circulates the recycled fluid back to the top drive 112.

The illustrated borehole 110 penetrates into a series of horizontal formation layers 118, at least one of which presumably includes a tight (low permeability) reservoir of hydrocarbon fluids. The borehole 110 is encased ("open") where it contacts the formation layers 118. To treat the reservoir layer, the crew injects an acidic treatment fluid 120 obtained by blending acid 121 with and other fluids and materials. The injected treatment fluid 120 enters the various formation layers via the open borehole. The relative flow rates and eventual distribution of the treatment fluids within the formation layers is governed by their (generally anisotropic) permeability.

FIG. 1A further shows a data acquisition unit 122 that collects measurements from the various sensors distributed across the platform, derrick, and downhole. In addition to measured depth, pump rate, hook load, torque, and other typical measurements collected by surface sensors, the data acquisition unit 122 may collect logging measurements received via telemetry signals from downhole logging sensors. The data acquisition unit 122 communicates the measurements via wired or wireless communications link 124 to a computer 126. Though shown here as a tablet computer, computer 126 can be embodied as a handheld mobile device, a notebook, a laptop, a desktop computer, a workstation, a mainframe, a virtual (e.g., cloud) computing system, or a networked combination of such devices including a distributed computing network. Thus computer 126 need not be limited to an on-site facility, but may be or include resources in an off-site computing facility, e.g., a remote central computing facility.

Computer 126 executes software to process the measurements into suitable form for display to a user. The information displayed by the computer may include an estimated or predicted distribution of treatment fluid in the formation layers, the estimate or prediction being based on measured formation permeability, layer thicknesses, and characteristics of the treatment fluid program including specified injection pressures, volumes and other properties of the treatment fluid. The user may employ the information to adjust the treatment fluid program. Alternatively, the user may specify desired targets and have the computer optimize the treatment program accordingly.

Figure 1B:
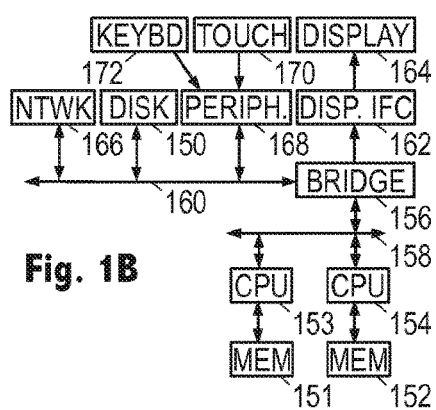
FIG. 1B is a block diagram of an illustrative formation flow simulator.

FIG. 1B is a block diagram of an illustrative computer 126 which, when executing suitable software, operates as a formation flow simulator. The simulation software is stored on disk 150 and loaded into memory 151, 152 for execution by one or more processors 153, 154. The processors 153, 154 communicate with each other and a bus bridge 156 via a high-speed processor bus 158. The bridge 156 couples communications from the high-speed processor bus 158 to an input/output bus 160 and to a display interface 162. The display interface 162 supplies a video stream to display device 164, optionally including a graphical user interface with a visual representation of the simulation results. The input/output bus 160 enables the processors to communicate with disk 150, a network interface 166, and a peripheral interface 168. The peripheral interface couples to a touch-sensitive surface 170 over display 164, a keyboard 172, or other input devices through which a user may enter commands and control the operation of the computer 126. The network interface 166 accepts communications from the wired or wireless link 124 and may further provide communications with a remote computing facility.

The block diagram of illustrative computer 126 is merely illustrative of the structure and operation of a typical processing device for executing software that implements the disclosed formation flow simulation methods and techniques. When operating in this fashion, the computer derives a distribution of fluid flows and components that can be stored on nonvolatile information storage media and displayed for a user to view and interact with. The user can responsively modify the proposed or ongoing fluid treatment program, e.g., adjusting injection (inlet) pressures, flow rates, durations, flow volumes, fluid densities, fluid viscosities, fluid compositions, shut-in times, etc. to optimize the efficiency of the treatment or otherwise achieve the desired goals of the treatment operation. Alternatively, the user may ask the computer to make such modifications automatically to achieve the desired goals. In some embodiments, the computer actuates valves and adjusts pumping rates to provide real time control for the treatment operation.

To enable the computer 126 to accurately simulate the flow of fluids to or from the formation without consuming an inordinate amount of computational resources (i.e., memory, processors, bus/network communications bandwidth, and "wall-clock" time), the software reduces the size of the simulation domain in a very strategic way. Namely, the simulation software models the formation as a set of horizontal layers that are symmetric about a straight borehole axis. In other words, the formation is assumed to vary along only one dimension (parallel to the borehole). Each layer of the formation can then be modeled with a corresponding one-dimensional flow path as demonstrated by FIG. 2. (This approach provides flow conditions that are averaged across the height and circumferential width of each layer.)

Figure 2:
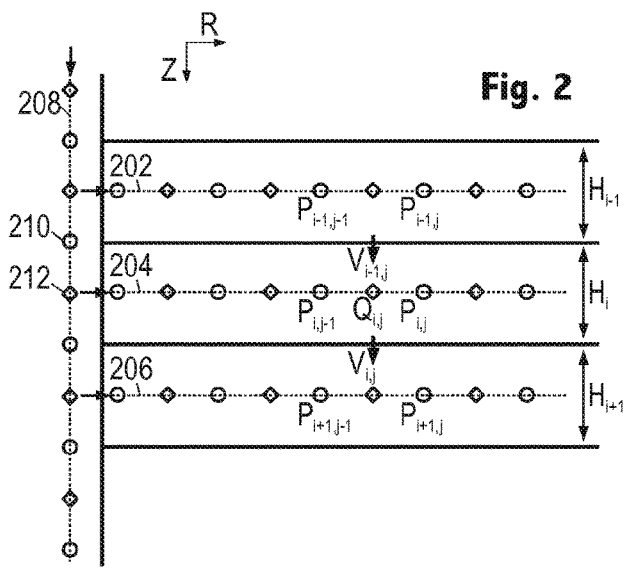
FIG. 2 is a diagram of a discretization grid for a one-dimensional formation model.

FIG. 2 shows an illustrative formation having three flow paths 202, 204, and 206, extending radially from the borehole, with each representing a corresponding formation layer. In practice, more layers may be modeled. A fourth flow path 208 represents the borehole which couples to each of the layer flow paths. Along each of the flow paths are staggered discretization points of two types. Circles indicate pressure discretization points 210, where the fluid pressure $p_{i,j}$ is calculated (i is the index indicating the flow path (or layer) number, and j is the index indicating the position of the discretization point along the flow path). Diamonds indicate flow rate discretization points 212, where the flow rate $q_{i,j}$ (or equivalently, the flow velocity $u_{i,j}$) is calculated. Discretizing of flow-paths in this fashion has been found to suppress numerical simulation artifacts.

It should be noted that finer discretizations produce more realistic and physically accurate results, and accordingly the number of discretization points employed along each of the flow paths is expected to be significantly higher than what is shown here. To ensure that the discretization is fine enough, the simulation software may repeat the simulation with a different number of discretization points and determine whether the simulation results have significantly changed. If so, the number of points should be increased until the results converge. Selected nodes may have their values set to provide boundary conditions for the simulation and account for interaction with the surrounding reservoir.

FIG. 2 further shows a height $H_i$ for each layer i, and the discretization points are positioned in the middle of the respective layers. Still further, FIG. 2 shows potential cross-flows between the layers to enable the simulation software to account for the general flow through the layers. Any such vertical flow between layers is presumed to occur at the flow rate discretization points. For the node i,j, the flow loss/gains $q_{i,j}$ are represented as arrows labeled $v_{i-1,j}$ and $v_{i,j}$. The following equations account for vertical permeability and cross-flow effects, unsteady flow, and incompressible and non-Newtonian fluids, and may be solved, for example, by using an implicit solver.

The one-dimensional model consists of cross-section-averaged unsteady mass and momentum governing equations that are solved for a generally circular borehole. The model's dynamic equations are for the averaged velocity and pressure, subject to the physics observations that the flow field is axisymmetric and velocity gradients in the z-direction are negligible. Thus, when focusing on the reservoir domain of interest, this leads to the following fluid's mass and momentum balance conservation equations:

$$\frac{\partial(\phi\rho)}{\partial t} + \frac{1}{r}\frac{\partial(r\rho u)}{\partial r} + \left[\frac{-(\rho v)_{Top}}{H} + \frac{(\rho v)_{Bottom}}{H}\right] = 0, \text{ and} \qquad (1)$$

$$\frac{\partial(\rho u)}{\partial t} + \frac{\mu}{K_h}u + \frac{\partial p}{\partial r} + \frac{\partial(r\rho u)}{r\partial r}[-(v)_{Top} + (v)_{Bottom}] = 0, \qquad (2)$$

where $\phi$ is the reservoir porosity, $\rho$ is the fluid density, $\partial/\partial t$ indicates a partial derivative with respect to time t, r is radial distance from the borehole axis, u is radial velocity of the fluid, $\partial/\partial r$ indicates a partial derivative with respect to radial distance r, v is velocity of the vertical cross-flow, H is the layer height, $\mu$ is the viscosity of the fluid, $K_h$ is the horizontal permeability, and p is pressure. The simulation software applies equations (1) and (2) to each control volume defined by a pair of pressure and flow rate discretization points.

Using Darcy's law, the cross-flow velocity can be calculated as:

$$v = -\frac{K_v}{\mu}\frac{\partial p}{\partial z}, \quad (3)$$

where $K_v$ is the vertical permeability, and $\partial/\partial z$ indicates a partial derivative with respect to depth z. Equation (3) can be expanded, e.g., as $$v|_{Top} = -\frac{K_v}{\mu}\Delta p_{Top}\left[\frac{2}{(H_{Top}+H)}\right], \quad (4)$$

where $H_{Top}$ is the height of the layer above the current layer, and the change in pressure is preferably computed as $$\Delta p_{top} = \frac{1}{2}\{(p_{i,j-1} + p_{i,j}) - (p_{i-1,j-1} + p_{i-1,j})\}, \quad (5)$$

with pressure $p_{i,j}$ being indexed as shown in FIG. 2. Similarly, $$\Delta p_{bottom} = \frac{1}{2}\{(p_{i+1,j-1} + p_{i+1,j}) - (p_{i,j-1} + p_{i,j})\}. \quad (6)$$

The foregoing mathematical model equations provide for mass and momentum conservation in the reservoir with fluid loss due to anisotropic permeability. Indeed, the last term in equation (1) is the source term representing the volumetric fluid mass loss/gain between the neighboring layers at a specific nodal location. Similarly, the last term in equation (2) represents the volumetric momentum loss/gain between the neighboring layers at a nodal location. At the top-most layer, fluid loss/gain is permitted through the model boundary, and a similar condition may be imposed on the bottom-most layer.

The simulation software constructs a set of sparse matrices representing the foregoing equations as applied to each of the control volumes. Boundary conditions are imposed by specifying selected node values. For example, the injected flow rate and/or fluid pressure may be specified by setting suitable values at the topmost discretization points in the borehole. Estimated formation pressures are provided at the outermost pressure discretization points of the layer flow paths.

The simulation software then solves the simultaneous equations by applying a linear solver to the sparse matrices. In so doing, the software derives a subsequent fluid flow state from a current fluid flow state. By iteratively applying the equations to each newly achieved fluid flow state, the software simulates the flow of the fluids through the formation.

Figure 3:
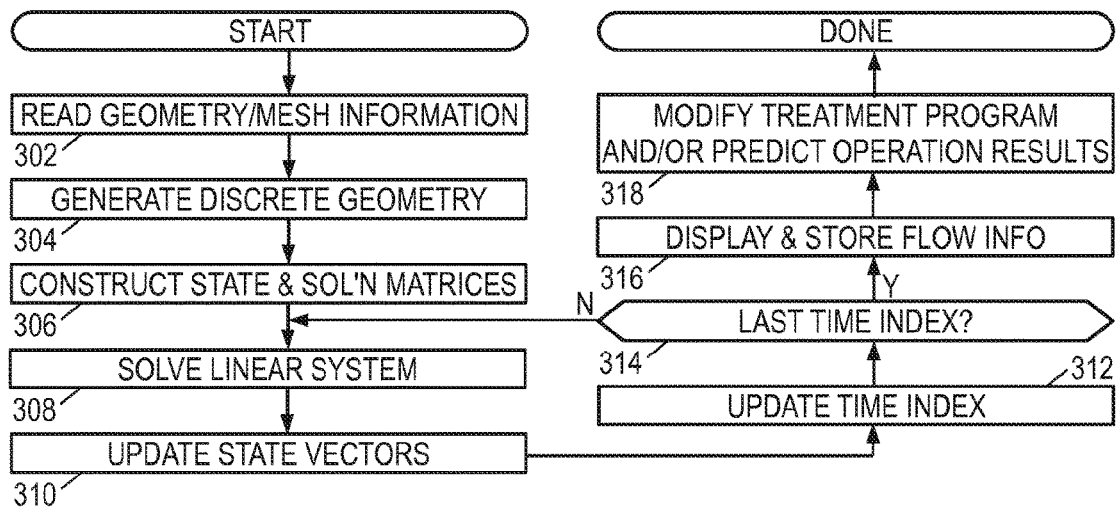
FIG. 3 is a flow diagram of an illustrative formation flow simulation method.

In view of the foregoing principles and techniques, FIG. 3 presents an illustrative formation flow simulation method that may be implemented in large part by the previously described computing systems. Though the operations of the method are shown and described as being sequential, in practice the operations are expected to occur concurrently and with potentially different orders.

FIG. 3 shows an illustrative simulation method in greater detail. It begins in block 302 with the simulation software obtaining information regarding the properties of the region and fluids to be simulated, including formation layering, permeability, injection rates, viscosities and boundary conditions. In block 304, the simulation software discretizes the borehole and layer flow paths.

In block 306, the simulation software constructs a state vector representing the parameter values at each of the discretization points, which initially represent the formation state before the treatment operation begins. The simulation software further constructs a sparse solution matrix representing the equations that govern the interactions between the nodes, including, e.g., equations (1)-(6). Together the state vector and solution matrix provide a system of linear equations that the simulation software solves in block 308 to express the subsequent state vector in terms of the current state vector.

In block 310, the simulation software saves the subsequent state vector and makes it the "current" state vector. In block 312, the time index is updated accordingly. The simulation software determines whether to terminate the simulation in block 314, e.g., when the last time index has been reached. If not, the simulation software repeats blocks 308-314 to determine subsequent states of the flow.

Otherwise in block 316, the simulation software stores the time-dependent distribution of fluid flow parameters on a non-transient information storage medium and displays a visual representation of them to a user. In block 318, the results are used as a prediction of the treatment operation outcome, enabling the treatment program to be evaluated and modified if necessary.

The simulation software may comprise one or more commercially available software packages and libraries installed in the computer to provide the functionality for solving linear systems. User-authored programs, functions, scripts, workflows, or other programming mechanisms may be employed to customize the operation of the software and automate the operations outlined above for simulating flow with a one-dimensional formation model. The simulation software may include a formation modeling module, a flow path discretization module, an equation construction module, an equation solving module, a user interface module, and other function modules, each implemented in the form of machine-readable instructions. Examples of suitable programming language instructions include C, C++, C++ AMP, D, Erlang, Python and Fortran. The computer can be preprogrammed with the software or can be programmed (and reprogrammed) by loading a program from another source (e.g., from a CD-ROM, from another computer device through a data network, or in another manner). Nevertheless, the implementation of the foregoing methods is not limited to any specific software language or execution environment. Though the operations of the method are shown and described as being sequential, in practice the operations are expected to occur concurrently and in a potentially different order.

Simulation software employing the foregoing techniques was applied, for example, to a one dimensional formation model having a 500 m payzone divided into three equally-sized horizontal reservoir layers and contacted by a vertical open borehole having a diameter of 0.1 m and a length of 1000 m. The effective outer radius of the model is 100 m and is maintained at a relative pressure of 0 Pa. Each of the three layers has a porosity of 0.2 and a horizontal permeability of $K_h = 1 \times 10^{-6}$ m$^2$. The injected fluid has a viscosity of $1 \times 10^{-3}$ Pa·s and a density of $1 \times 10^3$ kg/m$^3$. The fluid is injected with an inlet velocity of 10 m/s. The pressure discretization points are spaced 1 m apart along the borehole and layer flow paths, and the simulation time step is set at 0.01 s.

The simulation was run twice, once with a vertical permeability of $K_v=0$ (to generate a reference case without vertical cross-flow), and once with a vertical permeability of $K_v=1\times10^{-9}$ m$^2$. FIGS. 4A-4F show the simulation results at t=2.49 s.

Figure 4A:
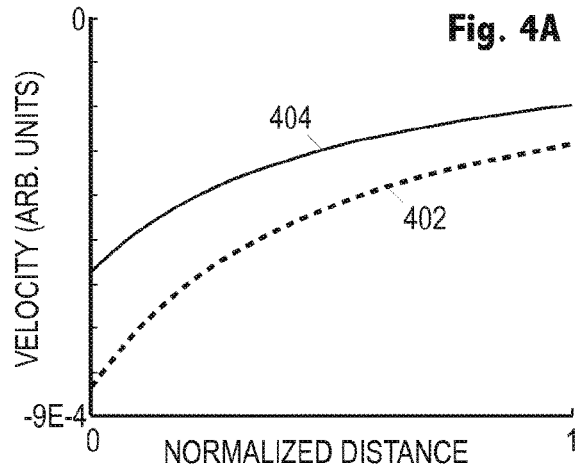
FIGS. 4A-4F are graphs of flow velocity and pressure as a function of position.
Figure 4B:
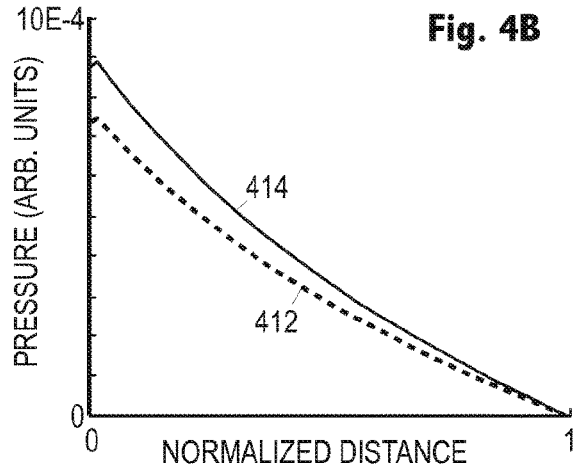

FIG. 4A compares the radial fluid velocity as a function of radial distance for the first layer, showing that the flow inward along the layer to the borehole with cross-flow (curve 404) is reduced relative to the flow without cross-flow (curve 402). As shown in FIG. 4B, the pressure as a function of radial distance is increased with cross-flow (curve 414) relative to the reference curve 412.

Figure 4C:
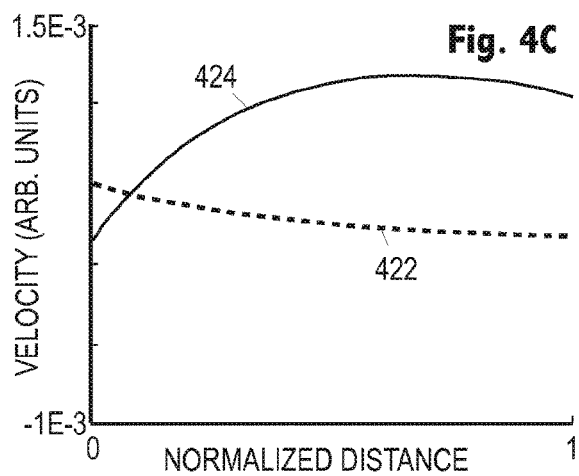
Figure 4D:
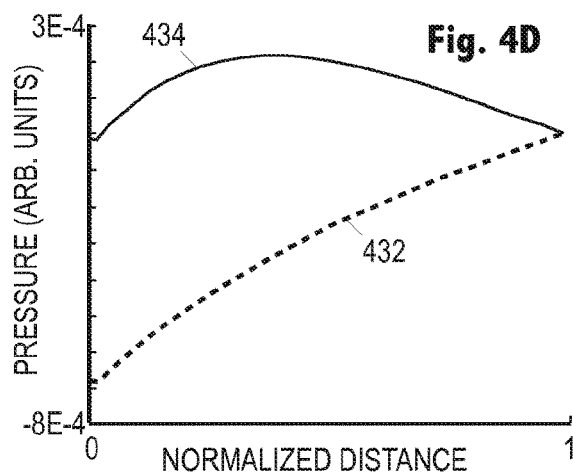

FIGS. 4C and 4D compare the radial fluid velocity and the pressure distribution in the second layer. The behavior here with cross-flow (curves 424, 434) departs significantly from the behavior without cross-flow (reference curves 422, 432). Both the reference radial flow and radial-flow with cross-flow velocities are outward, but the reference velocity curve 422 decreases monotonically while the cross-flow curve 424 increases with distance until a peak is reached and the velocity again falls. The reference pressure curve 432 increases monotonically while the cross-flow pressure curve 434 rises to a peak and then falls with distance.

Figure 4E:
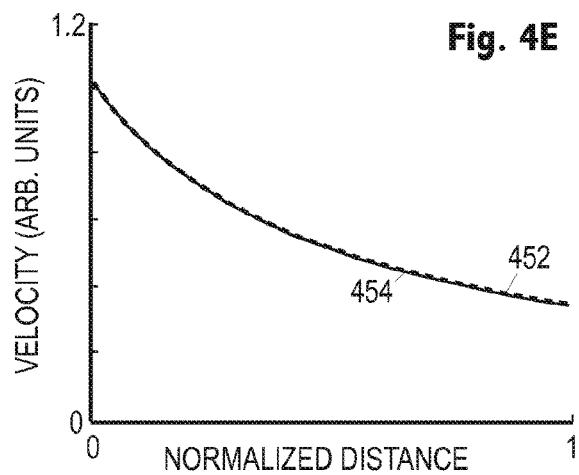
Figure 4F:
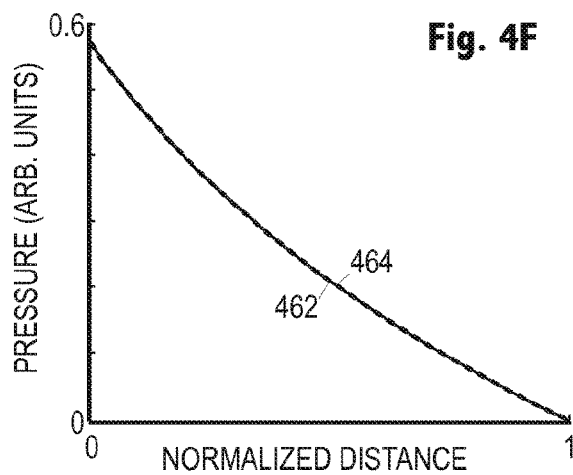

FIG. 4E shows the third layer's reference curve 452 and cross-flow curve 454, which are nearly indistinguishable. The cross-flow curve 454 falls slightly faster than the reference curve, due to fluid escaping into the second layer. The pressure curves 462, 464 for the third layer are indistinguishable.

Clearly, the bulk of the injected fluid flows through the third layer in both cases, but with the cross-flow, the top and bottom layers each lose flow to the middle layer, where the pressure is lower. The solution is stable at the high Reynolds numbers typically found in formation flow. These results suggest that the numerical scheme developed for this model is robust and results in very stable solutions for long time simulations. The cross-flow inherently affects the penetration of acid into the formation, and hence, the wormhole generation process.

Accordingly, there has been disclosed systems and methods that model the formation with one-dimensional (linear) fluid flow paths while accounting for cross-flow fluid gains/losses between the layers in both the mass and momentum balance equations. Vertical permeability is accounted for at the layer boundaries. While providing for reduced complexity and faster simulations, the model nevertheless yields accurate, stable, and robust solutions that properly account for the necessary physical principles. As such, the methods and systems are applicable to a wide variety of formation fluids including other treatment fluids such as sand-control resins, diversion and flooding fluids in enhanced oil recovery applications, and is fast enough for use in real-time control of the treatment operations. It may further have applicability for hydraulic fracturing applications and digital temperature sensing.

In summary, the embodiments disclosed herein include:

A: A formation flow simulation method that comprises: measuring a horizontal and vertical permeability of at least one bed in a formation penetrated by a vertical borehole; representing the borehole as a linear, discretized borehole flow path; representing the formation as a plurality of horizontal layers, each player of the plurality of horizontal layers being represented as a linear, discretized layer flow path; constructing a current state vector having values of flow parameters for the discretized borehole flow path and each of the discretized layer flow paths; constructing a solution matrix embodying a set of flow equations that relate the current state vector to a subsequent state vector, the flow equations employing the measured horizontal permeability for flow along the discretized layer flow path for the each layer and employing the measured vertical permeability for cross-flow to or from the each layer, wherein the solution matrix, current state vector, and subsequent state vector form a linear system of equations; solving the linear system of equations to derive the subsequent state vector from the current state vector; and storing the subsequent state vector on a non-transitory information storage medium.

B: A formation flow simulation system that comprises: a data acquisition unit collecting measurements of horizontal and vertical permeability for at least one bed in a formation penetrated by a vertical borehole; and a computer implementing a formation flow simulation method. The simulation method includes: representing the borehole as a linear, discretized borehole flow path; representing the formation as a plurality of horizontal layers, each layer of the plurality of horizontal layers being represented as a linear, discretized layer flow path; constructing a current state vector having values of flow parameters for the discretized borehole flow path and each of the discretized layer flow paths; constructing a solution matrix embodying a set of flow equations that relate the current state vector to a subsequent state vector, the flow equations employing the measured horizontal permeability for flow along the discretized layer flow path for the each layer and employing the measured vertical permeability for cross-flow to or from the each layer, wherein the solution matrix, current state vector, and subsequent state vector form a linear system of equations; solving the linear system of equations to derive the subsequent state vector from the current state vector; and storing the subsequent state vector on a non-transitory information storage medium.

Each of the embodiments A and B may further include one or more of the following additional features in any combination: (1) the linear system of equations accounts for injection of a treatment fluid into the borehole in accordance with a treatment program specifying at least one of: a flow rate, an inlet pressure, a fluid density, a fluid viscosity, a fluid volume, and a duration. (2) the method further comprises iteratively taking the subsequent state vector as the current state vector and solving the linear system of equations to derive a sequence of subsequent state vectors simulating a flow of the treatment fluid into the formation to obtain a time-dependent distribution of flow parameters. (3) the time-dependent distribution of flow parameters includes a fluid pressure distribution and a horizontal flow rate or flow velocity distribution. (4) method further comprises displaying a visual representation of the time-dependent distribution. (5) the system further comprises a monitor displaying a visual representation of the time-dependent distribution. (6) the method further comprises adjusting the treatment program based on the time-dependent distribution. (7) the measurements further include a height of each bed in the formation, and wherein said plurality of layers includes one or more layers for each bed, the one or more layers having a total height that equals the measured height. (8) the discretized layer flow paths include staggered discretization points for pressure and flow rate. (9) the equations calculate cross-flow between flow-rate discretization points.

Numerous variations and modifications will become apparent to those skilled in the art once the above disclosure is fully appreciated. The ensuing claims are intended to cover such variations where applicable.

What is claimed is:

1. A formation flow simulation method that comprises:
    measuring a horizontal and vertical permeability of at least one bed in a formation penetrated by a borehole;
    representing the borehole as a linear, discretized borehole flow path;
    representing the formation as a plurality of horizontal layers, each layer of the plurality of horizontal layers being represented as a linear, discretized layer flow path;
    constructing a current state vector having values of flow parameters for the discretized borehole flow path and each of the discretized layer flow paths;
    constructing a solution matrix embodying a set of flow equations that relate the current state vector to a subsequent state vector, the flow equations employing the measured horizontal permeability for flow along the discretized layer flow path for each layer and employing the measured vertical permeability for cross-flow to or from each layer, wherein the solution matrix, current state vector, and subsequent state vector form a linear system of equations;
    solving the linear system of equations to derive the subsequent state vector from the current state vector; and
    storing the subsequent state vector on a non-transitory information storage medium.

2. The method of claim 1, wherein the linear system of equations accounts for injection of a treatment fluid into the borehole in accordance with a treatment program specifying at least one of: a flow rate, an inlet pressure, a fluid density, a fluid viscosity, a fluid volume, and a duration.

3. The method of claim 2, further comprising:
    iteratively taking the subsequent state vector as the current state vector and solving the linear system of equations to derive a sequence of subsequent state vectors simulating a flow of the treatment fluid into the formation to obtain a time-dependent distribution of flow parameters.

4. The method of claim 3, wherein the time-dependent distribution of flow parameters includes a fluid pressure distribution and a horizontal flow rate or flow velocity distribution.

5. The method of claim 3, further comprising displaying a visual representation of the time-dependent distribution.

6. The method of claim 3, further comprising:
    adjusting the treatment program based on the time-dependent distribution.

7. The method of claim 3, wherein said measuring further includes measuring a height of the at least one bed in the formation, and wherein said plurality of layers includes one or more layers for the at least one bed, the one or more layers having a total height that equals the measured height.

8. The method of claim 3, wherein the discretized layer flow paths include staggered discretization points for pressure and flow rate.

9. The method of claim 8, wherein the equations calculate cross-flow between flow-rate discretization points.

10. A formation flow simulation system that comprises:
    a data acquisition unit collecting measurements of horizontal and vertical permeability for at least one bed in a formation penetrated by a borehole; and
    a computer implementing a formation flow simulation method that includes:
        representing the borehole as a linear, discretized borehole flow path;
        representing the formation as a plurality of horizontal layers, each layer of the plurality of horizontal layers being represented as a linear, discretized layer flow path;
        constructing a current state vector having values of flow parameters for the discretized borehole flow path and each of the discretized layer flow paths;
        constructing a solution matrix embodying a set of flow equations that relate the current state vector to a subsequent state vector, the flow equations employing the measured horizontal permeability for flow along the discretized layer flow path for the each layer and employing the measured vertical permeability for cross-flow to or from the each layer, wherein the solution matrix, current state vector, and subsequent state vector form a linear system of equations;
        solving the linear system of equations to derive the subsequent state vector from the current state vector; and
        storing the subsequent state vector on a non-transitory information storage medium.

11. The system of claim 10, wherein the linear system of equations accounts for injection of a treatment fluid into the borehole in accordance with a treatment program specifying at least one of: a flow rate, an inlet pressure, a fluid density, a fluid viscosity, a fluid volume, and a duration.

12. The system of claim 11, wherein the method further comprises:
    iteratively taking the subsequent state vector as the current state vector and solving the linear system of equations to derive a sequence of subsequent state vectors simulating a flow of the treatment fluid into the formation to obtain a time-dependent distribution of flow parameters.

13. The system of claim 12, wherein the time-dependent distribution of flow parameters includes a fluid pressure distribution and a horizontal flow rate or flow velocity distribution.

14. The system of claim 12, wherein the system further comprises a display showing a visual representation of the time-dependent distribution.

15. The system of claim 12, wherein the method further comprises:
    adjusting the treatment program based on the time-dependent distribution.

16. The system of claim 10, wherein said measurements further include a height of the at least one bed in the formation, and wherein said plurality of layers includes one or more layers for the at least one bed, the one or more layers having a total height that equals the measured height.

17. The system of claim 10, wherein the discretized layer flow paths include staggered positioning of discretization points for pressure and flow rate.

18. The system of claim 17, wherein the equations calculate cross-flow between flow-rate discretization points.

* * * * *